(12) United States Patent
Campany et al.

(10) Patent No.: US 7,105,801 B2
(45) Date of Patent: Sep. 12, 2006

(54) ACTUATOR WITH INTERRUPTER-TYPE LIMIT SWITCHES

(75) Inventors: Andrew Daniel Campany, Valencia, CA (US); Brian John Roth, Pasadena, CA (US); David Brian Welch, Santa Clarita, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 149 days.

(21) Appl. No.: 10/817,080

(22) Filed: Apr. 2, 2004

(65) Prior Publication Data

US 2005/0218311 A1    Oct. 6, 2005

(51) Int. Cl.
*G01D 5/34* (2006.01)
(52) U.S. Cl. .................. 250/231.13; 250/233; 341/13
(58) Field of Classification Search ............................. 250/231.13–231.18, 229, 233, 551; 318/8–15, 318/434; 388/903; 341/13, 31
See application file for complete search history.

(56) References Cited

U.S. PATENT DOCUMENTS

| | | | |
|---|---|---|---|
| 3,336,482 A | 8/1967 | Mierendorft et al. | |
| 3,498,328 A | 3/1970 | Mylting | |
| 3,588,512 A | 6/1971 | Hollien | |
| 3,989,943 A | 11/1976 | Campbell et al. | |
| 4,223,217 A | 9/1980 | Bongard et al. | |
| 4,607,160 A | 8/1986 | Sakakino | |
| 5,519,299 A | 5/1996 | Ferri et al. | |
| 6,285,021 B1 | 9/2001 | Fayfield | |
| 6,483,105 B1 * | 11/2002 | McAllister et al. | .... 250/231.13 |
| 6,561,481 B1 | 5/2003 | Filonczuk | |

FOREIGN PATENT DOCUMENTS

AT    345 515    9/1978

OTHER PUBLICATIONS

International Search Report, Appl. No. PCT/US2005/009775 filed Mar. 24, 2005.

* cited by examiner

*Primary Examiner*—Stephone B. Allen
*Assistant Examiner*—Suezu Ellis
(74) *Attorney, Agent, or Firm*—RatnerPrestia (57) ABSTRACT

An actuator comprising a motor for rotating a shaft connected via a gear train to an output device; an interrupter vane connected to the output device and adapted to travel in a path corresponding to the movement of the output device; and at least two interrupter switches, such as opto-interrupter switches, spaced apart from one another along the path of the interrupter vane at locations corresponding to travel limits of the output device. A controller energizes the motor in response to a command signal and de-energizes the motor in response to an indication from one of the interrupter switches that the output device is at or approaching one of the travel limits. The actuator may be a rotary or linear actuator, and may be particularly well-suited for avionics applications.

29 Claims, 5 Drawing Sheets

ACTUATOR WITH INTERRUPTER-TYPE LIMIT SWITCHES

FIELD OF THE INVENTION

This invention relates to actuators, particularly rotary actuators, such as are used for actuating valves, and linear actuators for airborne applications.

BACKGROUND OF THE INVENTION

Electric motor driven actuators are used for operation of various components throughout industry. For example, ITT Aerospace Controls, a company related to the assignee of the present invention, manufactures rotary actuators that are identified in commerce as part numbers S343T003-39 or MA20A1001-1 and depicted in FIGS. 1A and 1B. These actuators are typically used in aircraft on ball, butterfly, and/or gate valves on lines that supply, for example, water, hydraulic fluid, and/or fuel.

Figure 1A:
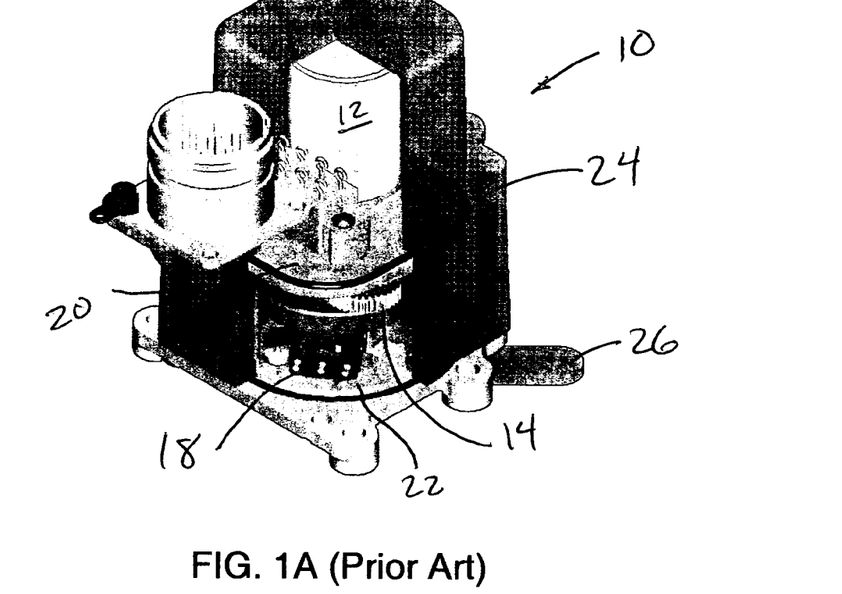
FIG. 1A is a partial cutaway perspective view of an actuator of the prior art.
Figure 1B:
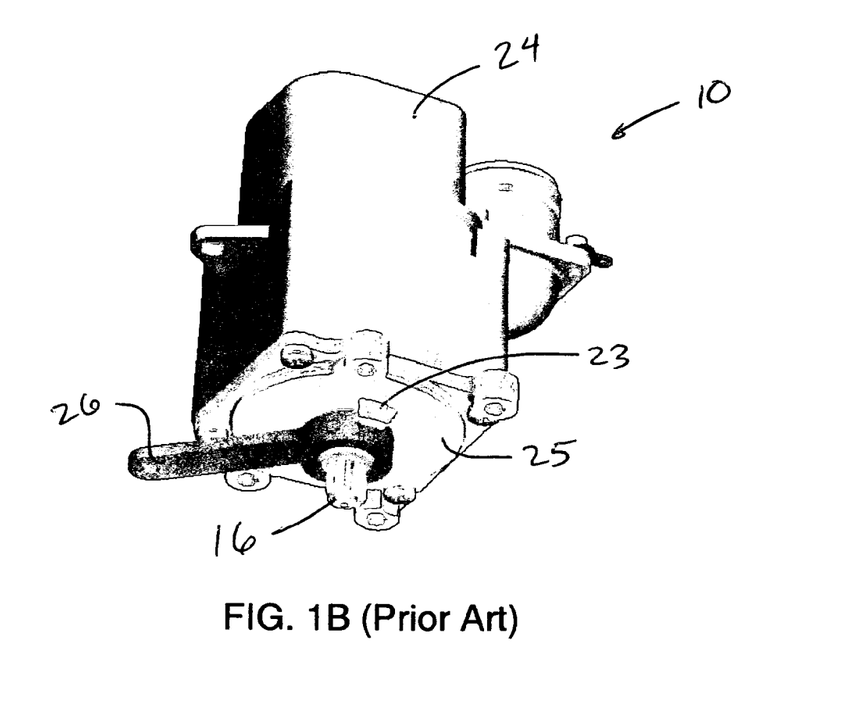
FIG. 1B is an underside perspective view of the actuator of FIG. 1A.

Actuator 10 utilizes a DC motor 12 and a planetary gear train 14 to provide 90-degree rotary actuation of output shaft 16. Typically, a cam (not shown) attached to output shaft 16 inside housing 24 activates one or more electro-mechanical micro-switches 18 for limitation of travel and indication of position of the actuator. Typically, four micro-switches are provided: two (one at each end) to limit travel and two to indicate position. A relay (not shown) typically controls the direction of the DC motor. Motor 12 is mounted on motor plate 20 and micro-switches 18 are mounted on switch plate 22, all of which are encased in housing 24 having a bottom cover 25. Manual valve handle 26 mounted to the output shaft 16 below the switch plate allows manual activation of the valve and visually indicates the valve position even in the absence of power. A manual stop 23 at each end of travel for the manual valve handle 26 provides a mechanical limit to travel of the output shaft.

There is a need in the art, however, for simplifying the mechanical design, improving reliability, improving manufacturability, and enhancing control of such actuators, while still maintaining a long life in a harsh operating environment, with minimal incremental cost required to make the improvements and enhancements.

SUMMARY OF THE INVENTION

One aspect of the invention comprises an actuator comprising a motor for rotating an input shaft connected to an output device via a gear train; an interrupter vane connected to the output device and adapted to travel in a path corresponding to the movement of the output device; and at least two interrupter switches spaced apart from one another along the path of the interrupter vane at locations corresponding to travel limits of the output device. Each interrupter switch comprises a source, a detector spaced from the source, and an interrupter channel aligned with the travel path or the interrupter vane and located between the source and the detector. The interrupter vane is adapted to be positioned within the interrupter channel when the shaft is positioned at the corresponding travel limit. Each interrupter switch indicates whether the detector detects an emission from the source and further may indicate a proportional amount of the source emission detected. A controller is connected to a power supply and to the interrupter switches for energizing the motor in response to a command signal and for de-energizing the motor in response to an indication from one of the interrupter switches that the interrupter vane is at or approaching one of the travel limits.

The actuator may comprise a rotary actuator, in which case the output device comprises a rotating output shaft, or a linear actuator, in which case the output device has a linear path. In a rotary actuator embodiment, the interrupter vane is rotationally fixed to and radially extended from the output shaft, and the interrupter switches are radially spaced relative to the output shaft and rotationally spaced from one another such that each interrupter channel is radially aligned with the rotational path of the interrupter vane.

In one embodiment, the interrupter switches are opto-interrupter switches in which the source comprises a light source, such as an infrared light emitting diode (LED), and the detector comprises a photodetector. The actuator may further comprise a position indicator, such as a MOSFET switch, corresponding to each interrupter switch.

The controller may comprise an H-Bridge circuit and may be adapted to energize the motor with a first voltage when the shaft is oriented in a first limit position and to energize the motor with a second voltage, opposite in polarity and equal in magnitude to the first voltage, when the shaft is oriented in a second limit position. The controller may also be adapted to provide dynamic braking of the motor, such as by shorting together terminals of the motor. In particular, the controller may be adapted to initiate dynamic braking in response to an indication from the interrupter switch that a predetermined amount of the source emission is detected that is less than a full source emission, more particularly a predetermined amount that is closer to no source emission than a full source emission.

An actuator of the present invention may have any or all of the features described above. Another aspect of the invention comprises an airplane having one or more of the actuators described herein.

Yet another aspect of the invention comprises a rotary actuator embodiment for actuating a valve and having opto-interrupter switches as described above. In this embodiment, the controller is connected to a power supply and to the opto-interrupter switches for energizing the motor in response to a command signal and for de-energizing and dynamically braking the motor in response to an absence of current received from either of the opto-interrupter switches. The controller is adapted to energize the motor with a first voltage upon receipt of the command signal in the absence of a threshold voltage from a first of the interrupter switches, and to provide a second voltage, opposite in polarity and equal in magnitude to the first voltage, upon receipt of the command signal in the absence of a threshold voltage from a second of the interrupter switches. The controller is further adapted to initiate dynamic braking in response to an indication from the interrupter switch that a predetermined amount of the source emission is detected that is less than a full source emission and closer to no source emission than a full source emission.

DETAILED DESCRIPTION OF THE INVENTION

Figures 2, 3A, 3B, 4:
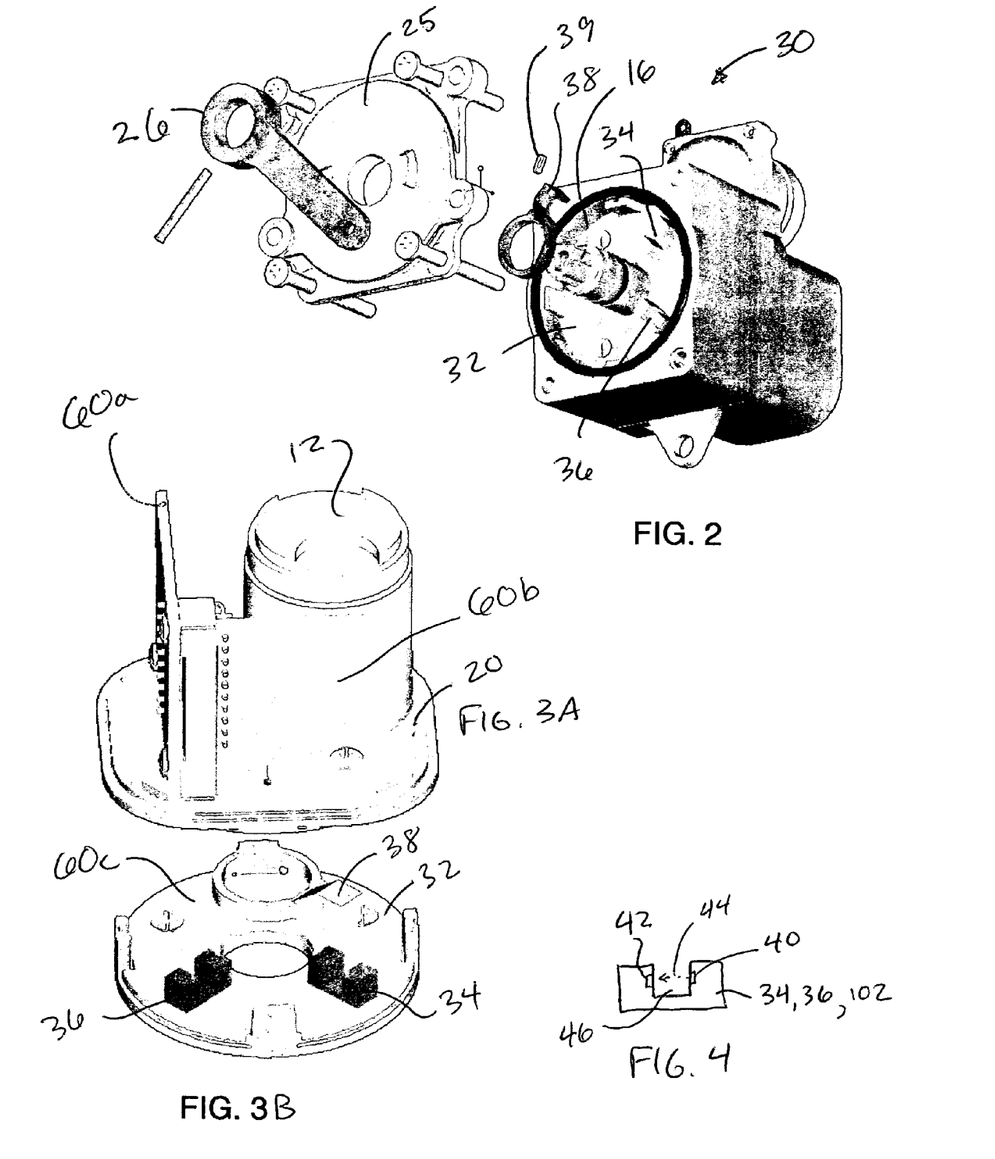
FIG. 2 is an exploded perspective view of an exemplary actuator of the present invention.
FIG. 3A is a perspective view of the motor plate and some attached components for the actuator shown in FIG. 2.
FIG. 3B is a perspective view of the switch plate and some attached components for the actuator shown in FIG. 2.
FIG. 4 is an illustration of an exemplary opto-interrupter switch.

The invention will next be described with respect to the figures. FIG. 2 is an exploded diagram of an exemplary actuator 30 of the present invention. FIG. 3A shows motor plate 20 and components mounted thereon, and FIG. 3B shows switch plate 32 and its components. As shown in FIG. 2, switch plate 32 is mounted to underside of motor plate 20 and comprises a pair of opto-interrupter switches 34 and 36. Interrupter vane 38 is rotationally fixed to and extends radially from output shaft 16. Each opto-interrupter switch 34, 36, shown schematically in FIG. 4, comprises a light source 40, for example a light emitting diode (LED) such as an infrared LED, a phototransistor 42 that is capable of detecting the emitted light 44, and an interrupter channel 46 positioned between the source and the detector. Switches 34 and 36 are radially spaced from shaft 16 and "rotationally spaced" from one another, meaning that the interrupter channel 46 of each switch is located along the rotational path of interrupter vane 38.

Phototransistor 42 typically converts the detected light into a voltage proportional to the amount of light detected. When nothing blocks light 44 between source 40 and the phototransistor 42, the interrupter switch transmits a full voltage. When drive shaft 16 rotates into a position in which interrupter vane 38 enters interrupter channel 46 and begins to partially block the light between the source and the-phototransistor, the switch transmits a voltage that is some fraction of the full voltage. When the interrupter vane is located completely within channel 46, phototransistor 42 is completely blocked from light source 40, and the switch transmits no voltage.

Figure 5:
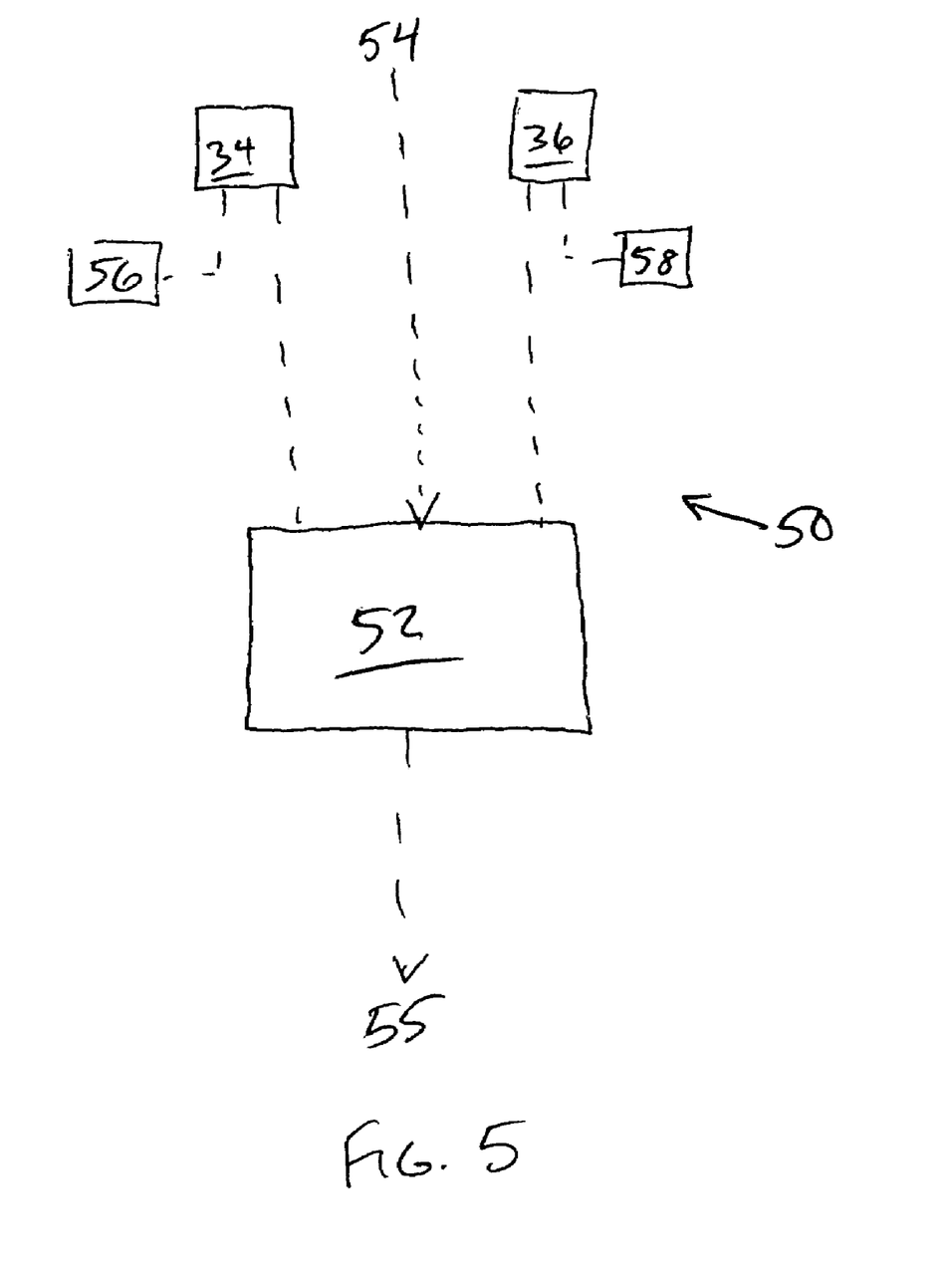
FIG. 5 is a schematic diagram of the inputs and outputs of an exemplary controller.

FIG. 5 shows in block diagram form the inputs and outputs of a portion of controller 50 that starts and stops the actuator motor in the desired direction. Controller 50 comprises a "H-Bridge" circuit 52, which is known in the art, that selects the polarity of the voltage 55 supplied to the actuator motor 12 based upon the inputs to the circuit. Circuit 52 receives an external command signal 54 that activates the actuator. When command signal 54 is received in the absence of a threshold voltage from switch 34 (indicating that interrupter vane 38 is positioned within channel 46 of switch 34), voltage 55 having a first value is supplied to motor 12 to turn the motor in the direction that rotates vane 38 toward switch 36. When command signal 54 is received in the absence of an electrical signal from switch 36, voltage 55 supplied to the motor is of a second value that is equal in magnitude but opposite in polarity from the first voltage and that turns the motor in the opposite direction.

When the end of the desired travel is detected by the opto-interrupter switch, application of voltage to the motor is removed and the motor supply terminals are shorted together to generate "dynamic braking" that rapidly stops the motion of the motor. Shorting the terminals of the motor together within the controller essentially turns the motor into a generator that converts the angular momentum stored by mass of the rotating system into electrical energy that is applied to the motor to create an opposing torque.

Figure 6:
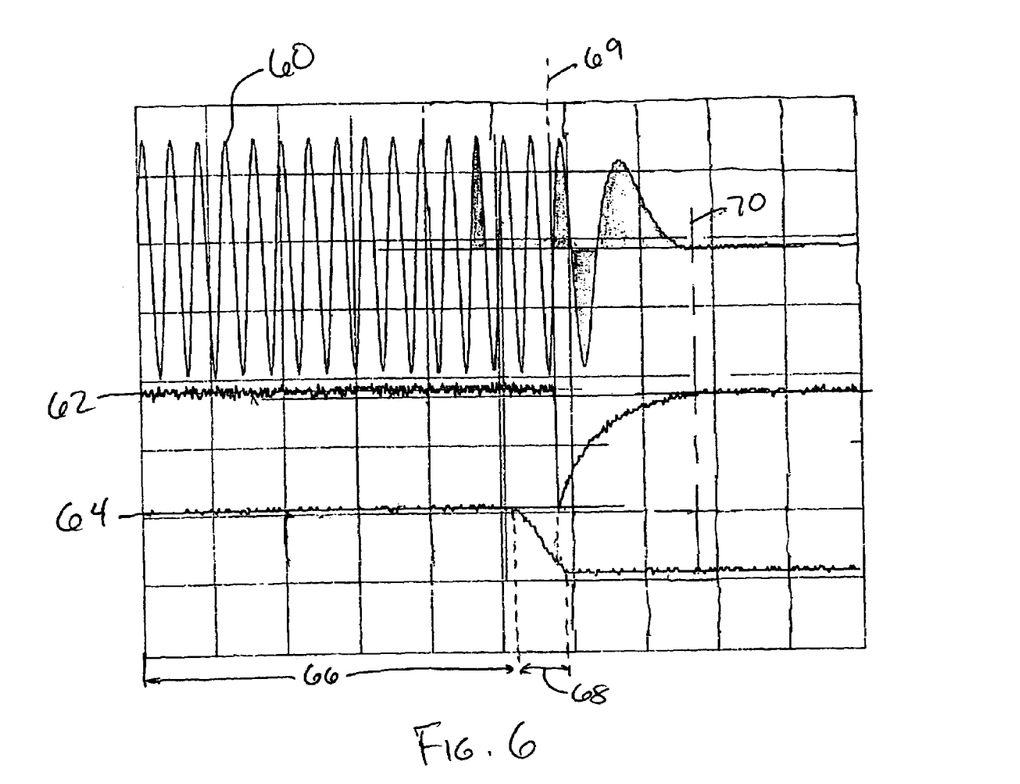
FIG. 6 is an exemplary oscilloscope plot of actuator travel, motor current, and phototransistor signal over time during steady-state travel, during dynamic braking, and after stopping.

The operation of the control system and dynamic braking is depicted in the exemplary oscilloscope plots of FIG. 6. Sinusoidal line 60 depicts the actuator rotation over time, where each cycle represents a degree of output shaft rotation. Line 62 depicts motor current over time. Line 64 depicts the voltage from the interrupter switch phototransistor over time. In the first region 66 of the plot, lines 60, 62, and 64 indicate that the actuator is turning at steady state as motor current is applied at a first polarity and the phototransistor is detecting the full emission of the LED source. In the second region 68 of the plot, the phototransistor voltage is in a transition region where the voltage is linearly decreasing as the interrupter vane begins to interrupt the amount of emission that reaches the phototransistor from the LED source. At a predetermined threshold position 69 in which the phototransistor voltage reaches a predetermined threshold value that is closer to its low value than its full value, the controller initiates dynamic braking by shorting the terminals of the motor together, thereby causing the motor current to immediately reverse in polarity and decay as the angular momentum of the rotating mass is converted to current that is applied to the motor to urge it in the opposite direction. As shown by the sinusoidal line 60, from the point 69 at which dynamic braking is initiated until the stopping point 70 of the actuator, the output shaft travels 1.5 degrees. It should be understood that the actuator rotation after initiation of dynamic braking may be greater or less than 1.5 degrees, depending upon the size of the actuator and the load to which it is attached.

The continued motion of the actuator after dynamic braking begins means that it is desirable to optimize the alignment of the actuator with the interrupter vane such that braking is initiated at the proper time. The actuator may be aligned to accommodate the proper stopping zone, for example, by first measuring the voltage from the opto-interrupter switch phototransistor with full light detection (V1), then measuring the phototransistor voltage with no light detection (V2). A "vane setting voltage" of (V2+K* (V1−V2)) may then be calculated, where K=a percentage that is typically closer to 0 than 100%, such as for example 20%. This is the voltage at which the controller is programmed to initiate dynamic braking. An optimized braking position (roughly corresponding to point 69 in FIG. 6) may then be defined at the nominal stopping point (point 70) minus the lead offset required to ensure the best stopping behavior under normal operating conditions of the actuator. For example, for a particular embodiment (the MA20A1001-1 actuator as converted to use opto-interrupter switches), the stopping zone was characterized to be between 1.5 to 2 degrees for all operating areas for motor load (0–50 in-lbs) at the nominal 28 volt motor supply voltage. The stopping zone was also characterized for lower (18V) and higher (36V) voltages to provide an understanding over all reasonable operating ranges for motor voltage. Based on these results, the optimal lead offset was chosen to be 1.75 degrees. Accordingly, for that system, the optimized braking position was defined to be the nominal stopping point minus 1.75 degrees. To align the actuator and the interrupter vane, the actuator may then be set at the optimized braking position while the interrupter vane is moved until the vane setting voltage is observed. The interrupter vane is locked into position relative to the output shaft at this position, such as with set screw 39, shown in FIG. 2.

It should be understood that the above procedure is one exemplary way of aligning the actuator and interrupter for a proper valve closing position, but other procedures may also be developed for proper alignment of the components at either or both ends of actuator travel. As the invention is not limited to any particular embodiment comprising an actuator with opto-interrupter switches, it should be understood that the stopping distances, voltages, loads, lead offsets, and the like are system-dependent and not limited to any particular values.

Each opto-interrupter switch 34 and 36, may also activate an associated position switch 56 and 58, respectively, such as a MOSFET switch that enters a low resistance state, to provide remote electronic feedback or visual indication of the position of the actuator (i.e. whether the attached valve is open or closed). Controller 50 may also have additional features (not shown), such as a microcontroller for monitoring motor current and circuit protection features to clamp voltage spikes in the actuator control voltages and to lockout inappropriate control signals, as are generally known in the art. The circuitry and other components that comprise controller 50 may be installed on one or more printed wiring boards (PWBs) 60a, 60b, and/or 60c, as shown in FIGS. 3A and 3B.

The above apparatus provides advantages over the prior art in that opto-interrupter switches eliminate a potential direct current path from the switch wiring to the output shaft because of the air gap between the interrupter vane, the source, and the detector. Furthermore, the interrupter vane may comprise a non-conductive material, such as plastic. Additionally, unlike electro-mechanical switches, opto-interrupter switches do not create sparking. In addition to the elimination of the mechanical switches, the control electronics of the invention as described above also eliminate the electromechanical relay present in the system of the prior art. The prevention of sparking and other electrical failures are important considerations for aerospace use where the actuators may operate in ambient environments wherein fuel vapor, or at least the risk of fuel vapor, may be present, and in which such events can have catastrophic consequences. The components of the invention as described above can be designed to operate in the harsh environment of aerospace applications, which typically requires qualification for operation at temperatures as low as −55 C. Although actuators of the present invention may be well-suited for aerospace applications, and specifically for use as valve actuators, the actuators are not limited to any particular application or use. The use of two opto-interrupter switches rather than a cam and 4 microswitches also reduces the number of components on the radial axis that need to be aligned for proper function of the actuator, and therefore minimizes tolerance "stack-up" that may otherwise require very tight tolerances on all components that may increase the overall manufacturing cost of the actuators.

Figures 7A, 7B, 7C:
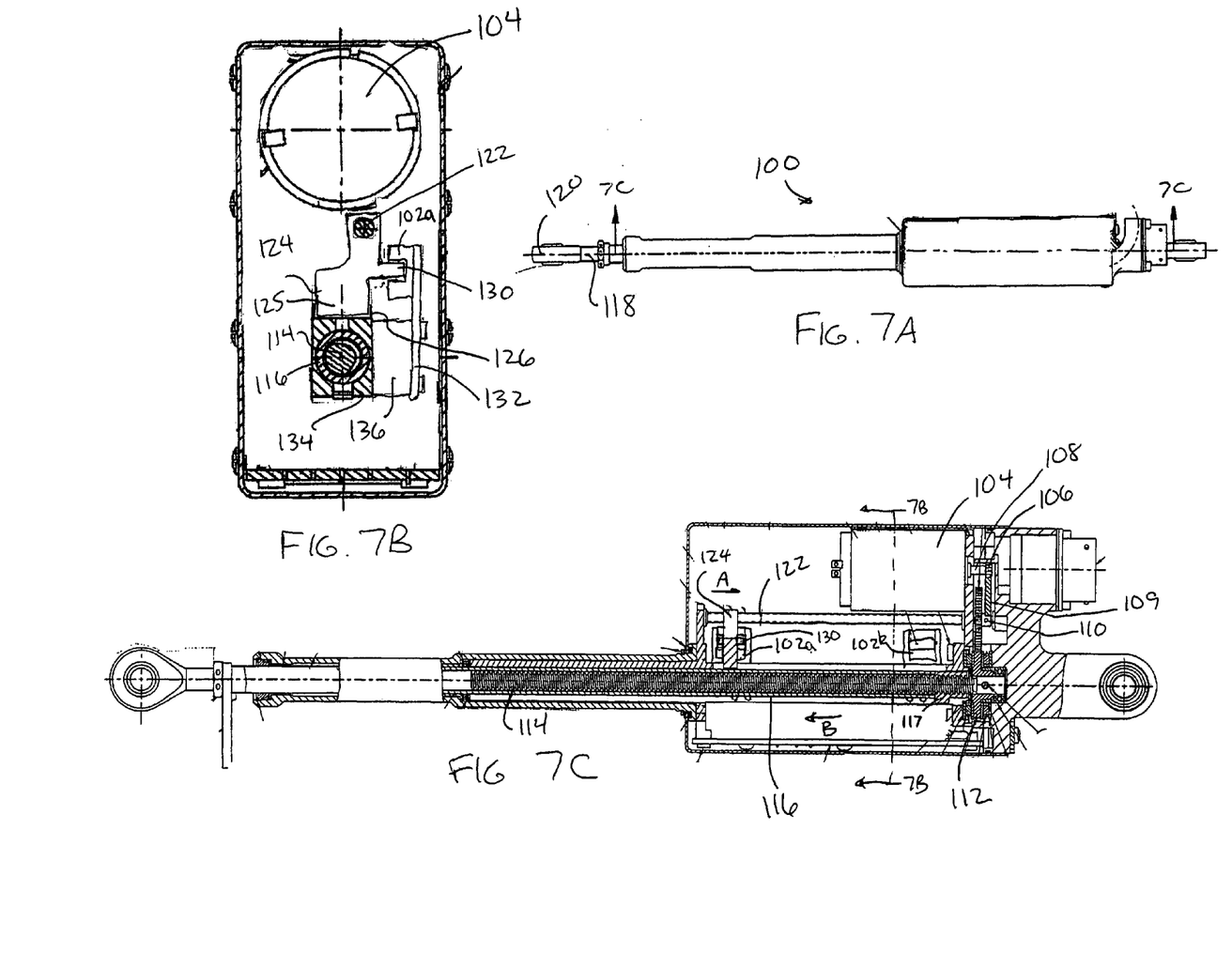
FIG. 7A is a top view of an exemplary linear actuator embodiment.
FIG. 7B is a cross-sectional view of the exemplary linear actuator embodiment of FIG. 7A, taken across line 7B—7B shown in FIG. 7C.
FIG. 7C is a longitudinal sectional view of the exemplary linear actuator embodiment of FIG. 7A, taken across line 7C—7C.

Although depicted in FIGS. 1–6 as a rotary actuator embodiment, it should be understood that the invention also extends to linear actuator embodiments as well. Linear actuators using opto-interrupter switches, particularly for airborne applications, have the same advantages as discussed above for rotary actuators. An exemplary linear actuator is shown in FIGS. 7A–C. The overall system and underlying controls relating to such a linear actuator are essentially identical as for a rotary actuator, except that instead of the motor driving a gear train having a rotational output, the motor drives a gear train with a linear output. The term "gear train" as used herein relates to any system for converting rotational input of the motor shaft to some output motion, regardless of whether the system literally contains conventional gears. In the rotary actuator example, the gear train comprises planetary gear train 14. In a linear actuator embodiment, the gear train may comprise, for example, a pinion or worm gear that moves a linear rack along a predetermined path, or as shown in FIGS. 7A–7C, a screw and bushing arrangement. Thus, whereas the output device of a rotary actuator has a rotational path, the output device in a linear actuator moves in a linear path.

Turning now to FIGS. 7A–7C, there is shown an exemplary linear actuator 100 comprising a plurality of opto-interrupter limit switches 102a, 102b. In the particular design shown in FIGS. 7A–7C, motor 104 turns pinion 106 at the end of input shaft 108. Pinion 106 drives compound gear 109 which drives idler gear 110 that in turn drives output gear 112, which turns output screw 114. Bushing 116, which surrounds output screw 114, comprises a female-threaded portion 117 that mates with male threads of the output screw. Rod 118 having rod end 120 is attached to the end of bushing 116. Rod end 120, which may be attached to any linear operated device such as a ventilation damper, for example, is therefore the output device that is driven by the actuator. Vane positioning screw 122 is axially mounted on idler gear 110, which turns the opposite direction of output gear 112. Traveler 124 comprises a lower extension 125 that fits within a horizontal channel 126 that runs parallel to output screw 114 for at least the distance between the interrupter switches 102. Traveler 124 also comprises a interrupter vane 130 that extends outwardly perpendicular to the output screw. Each switch 102 is attached to a bracket 132 that is fastened to screw housing 134 by a spacer 136.

Thus, in operation, traveler 124 moves in the direction of arrow A while bushing 116 moves in the direction of arrow B. Vane positioning screw 122 has a smaller diameter than output screw 114 and the size difference between screws 114 and 122 is more substantial than any size difference between gears 110 and 112, so the overall distance of linear travel of traveler 124 is less than female-threaded portion 117 of bushing 116. Nevertheless, the travel path of interrupter vane 130 "corresponds to" the travel path of output device (rod end 120), even though the paths are in the opposite direction, because the paths are proportional to one another. Similarly, in the rotary actual embodiment shown in FIG. 2, the rotational path of vane 38 sweeps a wider radius than the path of output shaft 16, but both paths are proportional to one another. In other embodiments, the travel paths of the interrupter vane and output device may be nearly identical. In still other embodiments, the interrupter vane may have a rotational path whereas the output device comprises a linear path, or vice versa. In all embodiments, however, it can be said that the interrupter vane travels in a path corresponding to the movement of the output device.

It should be understood that the particular rotary actuator embodiment shown in FIGS. 1–6 and the linear actuator embodiment shown in FIGS. 7A–7C are exemplary only, and that an infinite number of other embodiments may be provided. It should be further understood that there are an infinite number of gear trains that can be devised by those skilled in the art for translating the rotary output of a motor into a desired motion of an output device in a desired path, and that the invention is not limited to the use of any particular components.

Although preferred embodiments are described herein in which the interrupter switches comprise opto-interrupter switches, other types of interrupter switches may be used. For example, a Hall effect sensor interrupter switch may comprise a source that emits a magnetic field, a detector that detects the magnetic field, and an interrupter vane that absorbs the magnetic field. In all other respects, an invention comprising a Hall-effect interrupter switch may be identical to the embodiments described and shown herein for an opto-interrupter switch.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An actuator comprising:
   a motor for rotating an input shaft connected to an output device via a gear train;
   an interrupter vane connected to the output device and adapted to travel in a path corresponding to the movement of the output device;
   at least two interrupter switches spaced apart from one another along the path of the interrupter vane at locations corresponding to travel limits of the output device, each interrupter switch comprising a source, a detector spaced from the source, and an interrupter channel aligned with the travel path of the interrupter vane and located between the source and the detector, the interrupter vane adapted to be positioned within the interrupter channel when the output device is positioned at the corresponding travel limit, wherein the interrupter vane is in no more than one interrupter channel at any time, each interrupter switch adapted to indicate whether the detector detects an emission from the source; and
   a controller connected to a power supply and to the interrupter switches for energizing the motor in response to a command signal and for de-energizing the motor in response to an indication from one of the interrupter switches that the interrupter vane is at or approaching one of the travel limits.

2. The actuator of claim 1, wherein the actuator comprises a rotary actuator and the output device comprises a rotating output shaft, the interrupter vane is fixed to and radially extended from the output shaft such that the interrupter vane travels in a rotational path, and the interrupter switches are radially spaced from the output shaft and rotationally spaced from one another such that each interrupter channel is radially aligned with the rotational path of the interrupter vane.

3. The actuator of claim 2, wherein the interrupter switches are rotationally spaced 90 degrees apart from one another.

4. The actuator of claim 2, wherein the output device is connected to a valve.

5. The actuator of claim 2, wherein the gear train comprises a set of planetary gears.

6. The actuator of claim 1, wherein the actuator comprises a linear actuator and the output device has a linear path.

7. The actuator of claim 6, wherein the output device has a linear motion actuated by a first screw and the interrupter vane has a linear motion actuated by a second screw.

8. The actuator of claim 7, wherein the output device moves along a first path that has a first length in a first direction, and the interrupter vane moves along a second path that has a second length in a second direction, in which one of: (a) the first length is not equal to the second length, (b) the first direction is different from the second direction, or (c) a combination of (a) and (b).

9. The actuator of claim 1, wherein the interrupter switches are opto-interrupter switches in which the source comprises a light source and the detector comprises a photodetector.

10. The actuator of claim 1, wherein the source is a light emitting diode (LED).

11. The actuator of claim 10, wherein the LED is adapted to emit primarily infrared light.

12. The actuator of claim 1, wherein each interrupter switch is adapted to indicate a proportional amount of the emission detected from the source.

13. The actuator of claim 1, wherein the controller is adapted to de-energize the motor in response to an indication from one of the interrupter switches that a predetermined amount of the source emission is detected that is less than a full source emission.

14. The actuator of claim 13, wherein the controller is adapted to de-energize the motor in response to an indication from one of the interrupter switches that the predetermined amount of the source emission detected is closer to no source emission than to a full source emission.

15. The actuator of claim 1, wherein the controller is adapted to energize the motor with a first voltage when the output device is located in a first limit position and to energize the motor with a second voltage when the output device is located in a second limit position.

16. The actuator of claim 15, wherein the second voltage is opposite in polarity and equal in magnitude to the first voltage.

17. The actuator of claim 15, wherein the controller comprises an H-Bridge circuit.

18. The actuator of claim 17, wherein the controller further comprises one or more circuits for monitoring motor current, clamping voltage spikes in actuator control voltages, locking out inappropriate control signals, or a combination thereof.

19. The actuator of claim 1, further comprising a position indicator corresponding to each interrupter switch.

20. The actuator of claim 19, wherein the indicator comprises a MOSFET switch.

21. The actuator of claim 1, wherein the actuator is adapted for aerospace service.

22. The actuator of claim 1, wherein the motor comprises a DC motor.

23. The actuator of claim 1, wherein the controller is further adapted to provide dynamic braking of the motor in addition to de-energizing the motor.

24. The actuator of claim 23, wherein the controller is adapted to initiate dynamic braking by shorting together terminals of the motor.

25. The actuator of claim 23, wherein each interrupter switch is adapted to indicate a proportional amount of the emission detected from the source and the controller is adapted to initiate dynamic braking in response to an indication from one of the interrupter switches that a predetermined amount of the source emission is detected that is less than a full source emission and closer to no source emission than a full source emission.

26. An airplane comprising one or more actuators, each actuator comprising:
   a motor for rotating an input shaft connected to an output device via a gear train;
   an interrupter vane connected to the output device and adapted to travel in a path corresponding to the movement of the output device;
   at least two interrupter switches spaced apart from one another along the path of the interrupter vane at locations corresponding to travel limits of the output device, each interrupter switch comprising a source, a detector spaced from the source, and an interrupter channel aligned with the travel path of the interrupter vane and located between the source and the detector, the interrupter vane adapted to be positioned within the interrupter channel when the output device is positioned at the corresponding travel limit, wherein the interrupter vane is in no more than one interrupter channel at any time, each interrupter switch adapted to indicate whether the detector detects an emission from the source; and
   a controller connected to a power supply and to the interrupter switches for energizing the motor in response to a command signal and for de-energizing the motor in response to an indication from one of the interrupter switches that the interrupter vane is at or approaching one of the travel limits.

27. A rotary actuator for operating a valve, the actuator comprising:
   a motor for rotating a drive shaft connected to the valve;
   an interrupter vane fixed to and radially extended from the drive shaft, the interrupter vane adapted to travel in a rotational path;
   a pair of opto-interrupter switches radially spaced relative to the shaft and rotationally spaced from one another along the rotational path of the interrupter vane at locations corresponding to travel limits of the shaft, each opto-interrupter switch comprising a source, a phototransistor spaced from the source and adapted to transmit a voltage proportional to an amount of light detected by the phototransistor, and an interrupter channel radially aligned with the rotational path of the interrupter vane and located between the source and the phototransistor, the interrupter vane adapted to be positioned within the interrupter channel when the shaft is positioned at the corresponding travel limit; and
   a controller connected to a power supply and to the opto-interrupter switches for energizing the motor in response to a command signal and for de-energizing and dynamically braking the motor in response to an absence of current received from either of the opto-interrupter switches, the controller adapted to energize the motor with a first voltage upon receipt of the command signal in the absence of a threshold voltage from a first of the interrupter switches, and to provide a second voltage upon receipt of the command signal in the absence of a threshold voltage from a second of the interrupter switches, the second voltage opposite in polarity and equal in magnitude to the first voltage, the controller further adapted to initiate dynamic braking in response to an indication from one of the interrupter switches that a predetermined amount of the source emission is detected that is less than a full source emission and closer to no source emission than a full source emission.

28. A actuator comprising:
   a motor for rotating an input shaft connected to an output device via a gear train;
   an interrupter vane connected to the output device and adapted to travel in a path corresponding to the movement of the output device;
   at least two interrupter switches spaced apart from one another along the path of the interrupter vane at locations corresponding to travel limits of the output device, each interrupter switch comprising a source, a detector spaced from the source, and an interrupter channel aligned with the travel path of the interrupter vane and located between the source and the detector, the interrupter vane adapted to be positioned within the interrupter channel when the output device is positioned at the corresponding travel limit, each interrupter switch adapted to indicate whether the detector detects an emission from the source; and
   a controller connected to a power supply and to the interrupter switches for energizing the motor in response to a command signal and for de-energizing the motor in response to an indication from one of the interrupter switches that a predetermined amount of the source emission is detected that is less than a full source emission.

29. An airplane comprising one or more actuators, each actuator comprising:
   a motor for rotating an input shaft connected to an output device via a gear train;
   an interrupter vane connected to the output device and adapted to travel in a path corresponding to the movement of the output device;
   at least two interrupter switches spaced apart from one another along the path of the interrupter vane at locations corresponding to travel limits of the output device, each interrupter switch comprising a source, a detector spaced from the source, and an interrupter channel aligned with the travel path of the interrupter vane and located between the source and the detector, the interrupter vane adapted to be positioned within the interrupter channel when the output device is positioned at the corresponding travel limit, each interrupter switch adapted to indicate whether the detector detects an emission from the source; and
   a controller connected to a power supply and to the interrupter switches for energizing the motor in response to a command signal and for de-energizing the motor in response to an indication from one of the interrupter switches that a predetermined amount of the source emission is detected that is less than a full source emission.

* * * * *